US008479167B1

(12) United States Patent
Ashkenazi

(10) Patent No.: US 8,479,167 B1
(45) Date of Patent: Jul. 2, 2013

(54) DETECTING INDEXING ERRORS IN DECLARATIVE LANGUAGES

(75) Inventor: Yonatan Ashkenazi, Hod hasharon (IL)

(73) Assignee: Cadence Design Systems, Inc., San Jose, CA (US)

( * ) Notice: Subject to any disclaimer, the term of this patent is extended or adjusted under 35 U.S.C. 154(b) by 764 days.

(21) Appl. No.: 12/649,260

(22) Filed: Dec. 29, 2009

(51) Int. Cl.
*G06F 9/44* (2006.01)

(52) U.S. Cl.
USPC ............ 717/126; 717/104; 717/124; 717/128

(58) Field of Classification Search
None
See application file for complete search history.

(56) References Cited

U.S. PATENT DOCUMENTS

| | | | |
|---|---|---|---|
| 6,185,726 B1 | 2/2001 | Chou | |
| 7,353,467 B2 | 4/2008 | Robertson et al. | |
| 7,926,038 B2* | 4/2011 | Rossi et al. | 717/126 |
| 8,024,708 B2 | 9/2011 | Demetriou et al. | |
| 8,266,593 B2* | 9/2012 | Narayanan et al. | 717/124 |
| 8,370,820 B2 | 2/2013 | Guenthner et al. | |
| 2005/0149312 A1* | 7/2005 | McGaughy | 703/14 |
| 2006/0206869 A1 | 9/2006 | Lewis et al. | |
| 2007/0288910 A1 | 12/2007 | Bhat et al. | |
| 2008/0155494 A1* | 6/2008 | Gobel | 717/104 |
| 2008/0276206 A1 | 11/2008 | Mariani | |
| 2009/0125882 A1 | 5/2009 | Frigo et al. | |
| 2010/0199257 A1* | 8/2010 | Biggerstaff | 717/104 |
| 2011/0173591 A1* | 7/2011 | Prasad | 717/126 |
| 2011/0209123 A1* | 8/2011 | Kaur | 717/126 |
| 2011/0209124 A1* | 8/2011 | Kaur | 717/126 |
| 2011/0219360 A1 | 9/2011 | Srinivasa et al. | |
| 2011/0302560 A1* | 12/2011 | Nadbath et al. | 717/128 |

OTHER PUBLICATIONS

D. Walls, Distributed value system matrix: a new use for distributed usability testing, Oct. 2007, 7 pages.*
Lagadec et al., Smalltalk debug lives in the matrix, Aug. 2010, 6 pages.*
Weimer, M., et al., "Maximum Margin Matrix Factorization for Code Recommendation," RecSys 09, New York, New York, 4 pages (Oct. 23-24, 2009).
Chen, Z., "Optimal Real Number Codes for Fault Tolerant Matrix Operations," SC09, Nov. 14-20, 2009, Portland, Oregon, 10 pages (downloaded from www.cs.ucr.edu/~chen/papers/sc2009.pdf) (accessed on Apr. 11, 2013).

* cited by examiner

*Primary Examiner* — Thuy Dao
(74) *Attorney, Agent, or Firm* — Holland & Knight LLP; Mark H. Whittenberger

(57) ABSTRACT

A method for detecting program code errors including searching for lines of command codes in the program code. A line of command code includes command codes and indices. The lines of command codes are organized as paragraphs. At least one of the lines of commands codes in each paragraph is different from the other lines of commands codes in the paragraph. The method further including separating the command codes from the indices for the lines of command codes, wherein the indices are a matrix of indices, and each row of indices in the matrix of indices includes the sets of indices for each of the lines of command codes from one of the paragraphs; determining each set of vertical indices in the matrix of indices that does not match a known series; and reporting to a user computer each set of vertical indices that does not match the known series.

24 Claims, 9 Drawing Sheets

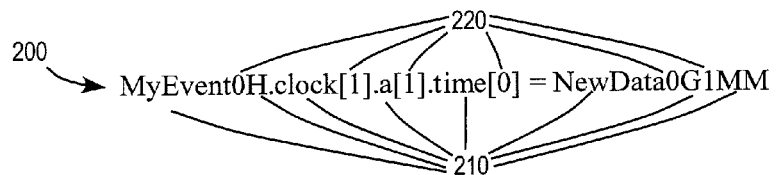

FIG. 2

```
                                                        ┌ 320
                                                        (
     MyEvent0H.clock[1].a[1].time[0] = NewData0G1MM;
     MyEvent0H.clock[1].a[0].time[0] = NewData0G0MM;
     MyEvent0H.clock[1].a[1].time[1] = NewData1G1MM;
     MyEvent0H.clock[1].a[0].time[1] = NewData1G0MM;
     MyEvent0H.clock[1].a[1].time[2] = NewData2G1MM;
     MyEvent0H.clock[1].a[0].time[2] = NewData2G0MM;
     MyEvent0H.clock[1].a[1].time[3] = NewData3G1MM;
     MyEvent0H.clock[1].a[0].time[3] = NewData3G0MM;
            ╱ MyEvent0H.clock[1].a[1].time[4] = NewData3G1MM;
     300 ╱                                              ╲___ 310
            MyEvent0H.clock[1].a[0].time[4] = NewData4G0MM;
     MyEvent0H.clock[1].a[1].time[5] = NewData5G1MM;
     MyEvent0H.clock[1].a[0].time[5] = NewData5G0MM;
     MyEvent0H.clock[1].a[1].time[6] = NewData6G1MM;
     MyEvent0H.clock[1].a[0].time[6] = NewData6G0MM;
```

FIG. 3

MyEvent0H.clock[1].a[1].time[0] = NewData0G1MM
MyEvent0H.clock[1].a[0].time[0] = NewData0G0MM
MyEvent0H.clock[1].a[1].time[1] = NewData1G1MM
MyEvent0H.clock[1].a[0].time[1] = NewData1G0MM
MyEvent0H.clock[1].a[1].time[2] = NewData2G1MM
MyEvent0H.clock[1].a[0].time[2] = NewData2G0MM
MyEvent0H.clock[1].a[1].time[3] = NewData3G1MM
MyEvent0H.clock[1].a[0].time[3] = NewData3G0MM
MyEvent0H.clock[1].a[1].time[4] = NewData3G1MM
MyEvent0H.clock[1].a[0].time[4] = NewData4G0MM
MyEvent0H.clock[1].a[1].time[5] = NewData5G1MM
MyEvent0H.clock[1].a[0].time[5] = NewData5G0MM
MyEvent0H.clock[1].a[1].time[6] = NewData6G1MM
MyEvent0H.clock[1].a[0].time[6] = NewData6G0MM
MyEvent0H.clock[1].a[1].time[7] = NewData7G1MM
MyEvent0H.clock[1].a[0].time[7] = NewData7G0MM
MyEvent0H.clock[1].a[1].time[8] = NewData8G1MM
MyEvent0H.clock[1].a[0].time[8] = NewData8G0MM
MyEvent0H.clock[1].a[1].time[9] = NewData9G1MM
MyEvent0H.clock[1].a[0].time[9] = NewData9G0MM
} 20 lines of command codes with the same commands.

clock[1].a[1].time[0] = NewData0G1MM
clock[1].a[1].time[0] = NewData0G1MM
} 2 lines of command codes with the same commands.

Event0H.clock[1].a[1].time[0] = NewData0G1MM
Event0H.clock[1].a[0].time[0] = NewData0G0MM
Event0H.clock[1].a[1].time[1] = NewData1G1MM
Event0H.clock[1].a[0].time[1] = NewData1G0MM
Event0H.clock[1].a[1].time[2] = NewData2G1MM
Event0H.clock[1].a[0].time[2] = NewData2G0MM
Event0H.clock[1].a[1].time[3] = NewData3G1MM
Event0H.clock[1].a[0].time[3] = NewData3G0MM
Event0H.clock[1].a[1].time[4] = NewData3G1MM
Event0H.clock[1].a[0].time[4] = NewData4G0MM
Event0H.clock[1].a[1].time[5] = NewData5G1MM
Event0H.clock[1].a[0].time[5] = NewData5G0MM
Event0H.clock[1].a[1].time[6] = NewData6G1MM
Event0H.clock[1].a[0].time[6] = NewData6G0MM
Event0H.clock[1].a[1].time[7] = NewData7G1MM
Event0H.clock[1].a[0].time[7] = NewData7G0MM
Event0H.clock[1].a[1].time[8] = NewData8G1MM
Event0H.clock[1].a[0].time[8] = NewData8G0MM
} 18 lines of command codes with the same commands.

FIG. 5A 500a 500b 500c 500d 500e 500d

MyEventH.clock[].a[].time[] = NewDataGMM; {011001}
MyEventH.clock[].a[].time[] = NewDataGMM; {010000}
MyEventH.clock[].a[].time[] = NewDataGMM; {011111}
MyEventH.clock[].a[].time[] = NewDataGMM; {010110}
MyEventH.clock[].a[].time[] = NewDataGMM; {011221}
MyEventH.clock[].a[].time[] = NewDataGMM; {010220}
MyEventH.clock[].a[].time[] = NewDataGMM; {011331}
MyEventH.clock[].a[].time[] = NewDataGMM; {010330}
MyEventH.clock[].a[].time[] = NewDataGMM; {011431}
MyEventH.clock[].a[].time[] = NewDataGMM; {010441}
MyEventH.clock[].a[].time[] = NewDataGMM; {011551}
MyEventH.clock[].a[].time[] = NewDataGMM; {010550}
MyEventH.clock[].a[].time[] = NewDataGMM; {011661}
MyEventH.clock[].a[].time[] = NewDataGMM; {010660}

```
case myType is when a1 =>
      Tmp <= TmpOld(8 downto 0);                          ⎫
      time <= time(8 downto 0) & timeOld(8 downto 0);     ⎬ 700a
      data <= data(8 downto 0);                           ⎭ when a2 =>
      Tmp <= TmpOld(9 downto 0);                          ⎫
      time <= time(9 downto 0) & timeOld(9 downto 0);     ⎬ 700b
      data <= data(9 downto 0);                           ⎭ when a3 =>
      Tmp <= TmpOld(10 downto 0);                         ⎫
      time <= time(10 downto 0) & timeOld(10 downto 0);   ⎬ 700c
      data <= data(9 downto 0);                           ⎭ when a4 =>
      Tmp <= TmpOld(11 downto 0);                         ⎫
      time <= time(11 downto 0) & timeOld(11 downto 0);   ⎬ 700d
      data <= data(11 downto 0);                          ⎭ when a5 =>
      Tmp <= TmpOld(12 downto 0);                         ⎫
      time <= time(12 downto 0) & timeOld(12 downto 0);   ⎬ 700e
      data <= data(12 downto 0);                          ⎭ end case;
```

FIG. 7A

The lines of code in FIG. 7A provide the following indices:
- {1, 8, 0, 8, 0, 8, 0, 8, 0}; ——705a
- {2, 9, 0, 9, 0, 9, 0, 9, 0}; ——705b
- {3, 10, 0, 10, 0, 10, 0, 9, 0}; ——705c
- {4, 11, 0, 11, 0, 11, 0, 11, 0}; ——705d
- {5, 12, 0, 12, 0, 12, 0, 12, 0}; ——705e

FIG. 7B

```
case myType is
    when a1 =>
        Tmp <= TmpOld(8 downto 0);
        time <= time(8 downto 0) & timeOld(8 downto 0);
        data <= data(8 downto 0);

when a2 | a3 =>
        Tmp <= TmpOld(9 downto 0);
        time <= time(9 downto 0) & timeOld(9 downto 0);
        data <= data(9 downto 0);

when a4 | a5 | a6 =>
        Tmp <= TmpOld(10 downto 0);
        time <= time(10 downto 0) & timeOld(10 downto 0);
        data <= data(9 downto 0);

when a7 =>
        Tmp <= TmpOld(11 downto 0);
        time <= time(11 downto 0) & timeOld(11 downto 0);
        data <= data(11 downto 0);

when a8 =>
        Tmp <= TmpOld(12 downto 0);
        time <= time(12 downto 0) & timeOld(12 downto 0);
        data <= data(12 downto 0);
end case;
```

- 805a → when a1 (800a)
- 805b → when a2 | a3 (800b)
- 805c → when a4 | a5 | a6 (800c)
- 805d → when a7 (800d)
- 805e → when a8 (800e)

| |
|---|
| 0. We couldn't detect the logic behind the series: 0,0,1,1,2,2,3,3,3,4,5,5,6,6 |
| /home/yonatan/cast/copy_paste_errors/designs/SBT/SBT_Router/dut/router_bad.y starting at line 486 |
| MyEventOH.clock[4].a[1].time[0] = NewData0G1MM;<br>MyEventOH.clock[4].a[0].time[0] = NewData0G0MM;<br>MyEventOH.clock[4].a[1].time[1] = NewData1G1MM;<br>MyEventOH.clock[4].a[0].time[1] = NewData1G0MM;<br>MyEventOH.clock[4].a[1].time[2] = NewData2G1MM;<br>MyEventOH.clock[4].a[0].time[2] = NewData2G0MM;<br>MyEventOH.clock[4].a[1].time[3] = NewData3G1MM;<br>MyEventOH.clock[4].a[0].time[3] = NewData3G0MM;<br>MyEventOH.clock[4].a[1].time[4] = NewData3G1MM;<br>MyEventOH.clock[4].a[0].time[4] = NewData4G0MM;<br>MyEventOH.clock[4].a[1].time[5] = NewData5G1MM;<br>MyEventOH.clock[4].a[0].time[5] = NewData5G0MM;<br>MyEventOH.clock[4].a[1].time[6] = NewData6G1MM;<br>MyEventOH.clock[4].a[0].time[6] = NewData6G0MM; |

FIG. 9

Assign hold_0 = (full_0 & (!addr[1] & !addr[0]));

Assign hold_1 = (full_1 & (!addr[1] & addr[0]));

Assign hold_2 = (full_2 & (!addr[1] & addr[0]));

FIG. 10

1. We couldn't detect the logic behind the usage of the '!', '&' signs
/home/yonatan/cast/copy_paste_errors/designs/SBT/SBT_Router/dut/router_bad.v starting at line 480

```
assign hold_0 = (full_0 & (!addr[1] & !addr[0]));
assign hold_1 = (full_1 & (!addr[1] &  addr[0]));
assign hold_2 = (full_2 & (!addr[1] &  addr[0]));
```

FIG. 11

DETECTING INDEXING ERRORS IN DECLARATIVE LANGUAGES

BACKGROUND OF THE INVENTION

The present invention generally relates to an apparatus and a computerized method for automated integrated circuit design. More particularly, the present invention relates to an apparatus and a computerized method for finding errors in programming code of declarative languages, which are used for automated integrated circuit design and automated integrated circuit design verification.

Integrated circuit (IC) design has been automated with IC design software. IC design software has aided in reducing the amount of human labor involved in generating designs for ICs. Once a design for an IC is generated by the IC design software, the design is typically verified by one or more verification programs. Verification is a process of determining whether the design will work properly for its intended purpose. That is, verification is a process of determining whether the design meets the design specifications. Both design generation and design verification are typically highly computer intensive processes. Designs for ICs may be generated and verified using tens, hundreds, or more computers on a computer farm running. Verification programs are often written specifically to verify a given design. Errors in the various computer codes for a design and of the verification programs used to verify the design often significantly delays the verification of the design.

Different types of programming languages are used for generating IC designs and for the verification programs that verify the designs. One particular class of programming languages, referred to as the declarative languages, is often used for generating IC designs and for verification programs. Examples of declarative languages include VERILOG, HDL (hardware descriptive language), and the like. In the electronics field, for example, HDL includes languages from a class of computer languages and/or programming languages configured for formal description of digital logic and electronic circuits. HDL may describe the circuit's operation, its design and organization, and tests to verify its operation by means of simulation. HDLs typically include standard text-based expressions of the spatial and temporal structure and behavior of electronic systems. HDLs are used to write executable specifications of some piece of hardware. A simulation program, designed to implement the underlying semantics of the language statements, coupled with simulating the progress of time, provides the hardware designer with the ability to model a piece of hardware before it is created physically.

Declarative languages, such as HDLs, typically have a relatively simple syntax. Due to the relatively simple syntax of declarative languages, numerous sequential lines of computer code are often repeated. Programmers generating computer code in a declarative language typically type one or more lines of computer code and then cut and paste these few lines of computer code repeatedly to write an extended portion of a computer program. This repetitive cut and paste process typically introduces numerous typographical errors that are difficult to locate by looking at the code. More specifically, the lines of computer code of declarative languages often have indices (e.g., numbers and/or symbols) that vary, but the indices are located inside and adjacent to extended portions of text. Detecting errors in the indices by visual inspection often proves difficult.

Programs called linters are often written and used to scan for errors in the computer program codes for both designs and verification programs. The linters analyze the computer program code to identify known errors and report these errors to designers via the designers computer stations. The errors in the code may be fixed before the computer program code is executed so that the errors do not need to be located while the program is running (often referred to as debugging). The use of linters ease the burden on designers and programmers to find their own typographical errors. While linters have been successful at locating certain types of errors in computer program code, other errors are not so easily located.

Therefore, there is a need for an apparatus and method to locate the errors, which are common in freshly written programming code for declarative languages (or other type of repetitive syntax computer languages), and provide guidance to a programmer to aid the programmer to locate and fix the errors.

BRIEF SUMMARY OF THE INVENTION

The present invention generally provides an apparatus and a computerized method for automated integrated circuit design. More particularly, the present invention provides an apparatus and a computerized method for finding errors in programming code of declarative languages, which are used for automated integrated circuit design and automated integrated circuit design verification.

One embodiment of the computerized method for detecting potential errors in lines of program code includes the step of searching, by a set of computers on a computer farm, for lines of command codes in the lines of program code. A line of command code includes a set of command codes and a set of indices for the set of command codes. The lines of command codes are organized as a plurality of paragraphs, and at least one of the lines of commands codes in each of the paragraphs is different from the other lines of commands codes in the paragraph. The method further includes separating, by the set of computers on the computer farm, the sets of command codes from the sets of indices for the lines of command codes. The sets of indices are a matrix of indices, and each row of indices in the matrix of indices includes the sets of indices for each of the lines of command codes from one of the paragraphs. The method further includes determining, by the set of computers on the computer farm, each set of vertical indices in the matrix of indices that does not match at least one known series in a set of known series; and reporting, by the set of computers on the computer farm, to a user computer each set of vertical indices that does not match the at least one known series.

According to a specific embodiment of the computerized method, at least one of the lines of commands codes in one of the paragraphs does not match a corresponding line of commands codes in another one of the paragraphs, and the matrix of indices does not include a column of indices, which corresponds to the at least one line of command codes and the lines of command codes corresponding to the at least one line of command codes. The computerized method may further include displaying on the user computer, for each of the sets of vertical indices that does not match the at least one known series, the number of steps for each of the sets of vertical indices that does not match the at least one known series. The computerized method may further include generating, by the set of computers on the computer farm, a grade for each of the sets of vertical indices that does not match the at least one known series based on the number of steps that the set of vertical indices does not match the at least one known series and based on the number of indices in the set of vertical indices. The reporting step may include: i) reporting, by the set of computers on the computer farm, to a user computer each set of the vertical indices that does not match the at least one known series if the grade for the set of vertical indices is below a threshold grade; and ii) not reporting, by the set of computers on the computer farm, to a user computer each set of the vertical indices that does not match the at least one known series if the grade for the set of vertical indices is the same as, or above, the threshold grade. The grade is further based on at least one set of vertical indices that precedes each of the sets of vertical indices that does not match the at least one known series, and may be further based on at least one set of vertical indices that follows each of the sets of vertical indices that does not match the at least one known series.

According to another specific embodiment of the computerized method, the method further includes displaying on the user computer each of the sets of vertical indices that does not match the at least one known series. The computerized method may further include determining, by the set of computers on the computer farm, within each of the sets of vertical indices that does not match the at least one known series, the indices that differ from the at least one known series, wherein the reporting step includes reporting to the user computer the indices that differ from the at least one known series. The computerized method may further include displaying on the user computer, for each of the sets of vertical indices that does not match the at least one known series, the indices that differ from the at least one known series.

According to another specific embodiment of the computerized method, the reporting step includes reporting to the user computer replacement indices from the at least one known series that differ from each of the sets of vertical indices that does not match the at least one known series. The computerized method may further include displaying on the user computer, for each of the sets of vertical indices that does not match the at least one known series, the replacement indices. The computerized method may further include reporting, by the set of computers on the computer farm to the user computer, the lines of command codes. The indices include numbers, letters, or symbols. The set of known series includes at least one of an arithmetic series, a geometric series, a series of the same index, a repeating series exists, a double series exists, an arithmetic-geometric series and a binary number of ones series. The lines of program code are in a declarative language.

According to another embodiment of the present invention, a computer readable storage medium contains program instructions that, when executed by a controller within a computer, cause the controller to execute the method steps discussed above for detecting potential errors in the lines of program code.

According to another embodiment of the present invention, a computer program product for detecting potential errors in the lines of program code on a computer readable medium includes computer code for the above described method steps.

According to another embodiment of the present invention, a computer system includes a set of computers, wherein each of the computers is configured to perform a portion of a method for detecting potential errors in lines of program code. Each computer includes at least one processor, and a computer-readable memory including computer code for the processor to execute a portion of the method. The method steps include a step of searching, by the set of computers, for lines of command codes in the lines of program code. A line of command code includes a set of command codes and a set of indices for the set of command codes. The lines of command codes are organized as a plurality of paragraphs, and at least one of the lines of commands codes in each of the paragraphs is different from the other lines of commands codes in the paragraph. The method steps further include the step of separating, by the set of computers, the sets of command codes from the sets of indices for the lines of command codes. The sets of indices are a matrix of indices, and each row of indices in the matrix of indices includes the sets of indices for each of the lines of command codes from one of the paragraphs. The method steps further include the steps of determining, by the set of computers, each set of vertical indices in the matrix of indices that does not match at least one known series in a set of known series; and reporting, by the set of computers, to a user computer each set of vertical indices that does not match the at least one known series.

A better understanding of the nature and advantages of the present invention may be gained with reference to the following detailed description and the accompanying drawings.

BRIEF DESCRIPTION OF THE DRAWINGS

FIG. 2 is a diagram that includes an exemplary line of program code from an exemplary declarative language;

FIG. 3 is a diagram that includes a number of exemplary lines of program code where the lines of program code are lines of command code of a declarative language;

FIG. 5A shows 40 example lines of command codes according to one embodiment of the present invention;

FIG. 5B shows exemplary lines of "separated" command codes generated from the lines of command codes shown in FIG. 3;

FIG. 6 shows the column indices organized as sets of indices;

FIG. 7A shows five example paragraphs where each example paragraph includes four example lines of command codes;

FIG. 7B shows an example matrix of indices that might be generated by the computer farm from the paragraphs shown in FIG. 8A;

FIG. 8A shows five example paragraphs where each example paragraph includes four example lines of command codes;

FIG. 8B shows an example matrix of indices that might be generated by the computer farm from the paragraphs shown in FIG. 8A;

FIG. 9 is an exemplary output that may be displayed on computer monitor 140 for viewing by a user;

FIG. 10 shows a number of lines of command codes that includes symbols; and

FIG. 11 is an exemplary output that may be displayed on the computer monitor for viewing by a user.

DETAILED DESCRIPTION OF THE INVENTION

The present invention generally provides an apparatus and a computerized method for automated integrated circuit design. More particularly, the present invention provides an apparatus and a computerized method for finding errors in programming code of declarative languages, which are used for automated integrated circuit design and automated integrated circuit design verification.

Figure 1:
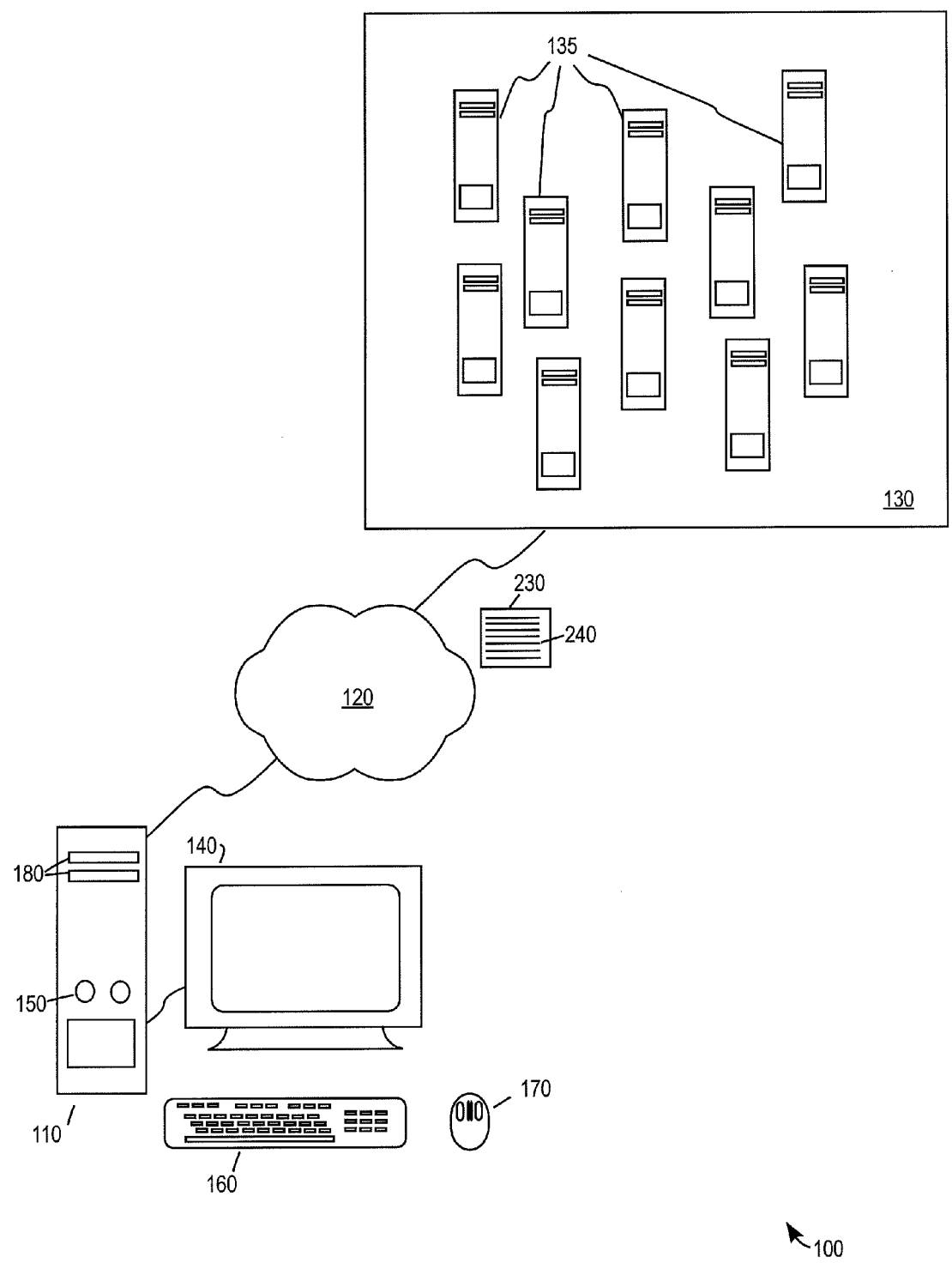
FIG. 1 is a simplified schematic of a computing system according to one embodiment of the present invention.

FIG. 1 is a simplified schematic of a computing system 100 according to one embodiment of the present invention. The computing system includes a user computer 110 coupled through a network 120 to a computer farm 130. The user computer may be a personal computer (such as a desktop computer), a work station, a laptop computer, or the like. The user computer may be a computer at which a computer programmer, circuit designer, or the like may work to write a computer program or generate a design for an IC. For example, a computer programmer may work at the user computer to write computer programming code to verify an IC design. A computer program configured to verify an IC design is often referred to as a verification program. The user computer may include a computer monitor 140 and a set of speakers 150 on which audiovisual data may be presented to a user (e.g., a human user). The user computer may also include one or more control devices, such as a keyboard 160, mice 170, a puck, a joystick, etc. The user computer may also include one or more processors, one or more memory devices 180 on which computer code and any results generated and output by the running computer code may be stored. The one or more memory devices may include a RAM, a ROM, a writable CD and drive for the writable CD therefore, a hard disk drive, an optical drive, etc.

Network 120 may include a local area network and/or a wide area network, such as the Internet. Network 120 may also include one or more server computers, which are configured to facilitate communications on the local area network and the wide area network. The one or more servers may include various memory devices for storing computer code, and for storing any results generated by the computer code running on the one or more servers, the user computer, and/or the computer farm. A memory device may include one or more of a RAM, a ROM, a writable CD and drive for the writable CD therefore, a hard disk drive, an optical drive, etc.

Computer farm 130 may include a plurality of computers 135, which may include person computers, super computers, server computers, etc. The computer farm may include one or more memory devices, such as the memory devices 180 and 200 described above. The memory device may be a collective memory device for collective use by the computers on the computer farm. Each computer on the computer farm may also include one or more memory devices, such as memory devices 180 and 200. Each of the memory devices described herein may by configured to store computer code configured to embody embodiments of the present invention.

Embodiments of the present invention include a computerized method that is configured to be executed by computer system 100. Additional embodiments of the present invention include a computer program product that includes computer code, which is configured to be stored in one or more memories of computer system 100 and run on computer system 100. Embodiments of the present invention are configured to locate potential errors in computer code, which may be written in a declarative language or other language that includes a number of lines of sequential lines of program code with the same syntax but different indices. Computer system 100 executing the computerized methods of the present invention is a machine configured to locate the potential errors in computer code. Computer system 100 executing the computerized methods described herein is an apparatus (or machine) according to an embodiment of the present invention.

The computer code in which potential errors are located by embodiment of the present invention may include computer code of a declarative language. The computer code may be for an IC design, a verification program for verifying an IC design, or the like. Declarative languages typically have fairly simple syntax, and due to the relatively simple syntax numerous sequential lines of computer code having the same commands are often repeated a number of times. Programmers generating computer code in a declarative language typically type one or more lines of computer code and then cut and paste these few lines of computer code repeatedly to write an extended portion of a computer program. This repetitive cut and paste process typically generates numerous typographical errors that are difficult to locate by looking at the code.

FIG. 2 is a diagram that includes an exemplary line of program code 200 from an exemplary declarative language. The line of program code 200 is a line of "command" code. The line of command code includes commands 210 and indices 220 for the commands. The indices are variable for the commands. The commands for a plurality of sequential lines of command code are generally static, whereas the indices tend to vary across the lines of command code.

FIG. 3 is a diagram that includes a number of exemplary lines of program code where the lines of program code are lines of command code of a declarative language. The exemplary lines of command code shown in FIG. 3 have the same commands. The indices vary across the lines of command codes as is typical of lines of command code. Because these exemplary lines of command code are typically generated via a cut and paste process by a user, the indices are often not edited correctly and thereby errors are introduced into the indices. For example, in the exemplary lines of command codes shown in FIG. 3, the command code line 300 may include an error in index 310. The pattern of the indices along column 320, which includes index 300, appears as though it should be 00112233445566, but is 00112233345566. That is, the third "3" in the column appears as though it should be a "4". The third "3" may or may not be an error in command code line 300. However, this third "3" appears to have broken a simple arithmetic series. The broken arithmetic series indicates that the third "3" is likely an error. Various embodiments of the preset invention are configured to identify this potential error, for example, and others, and notify a user of the potential error via user computer 110. On notification of the potential error, the user of computer system 100 may then decide whether the third "3" is an actual error. By locating potential errors in lines of command codes, the user is saved some of the tedium and the time of trying to locate these potential errors by site or during debug. Described immediately below is one embodiment of a computerized method of the present invention that is configured to identify potential errors in lines of command codes and notify a user of the potential errors.

Figure 4:
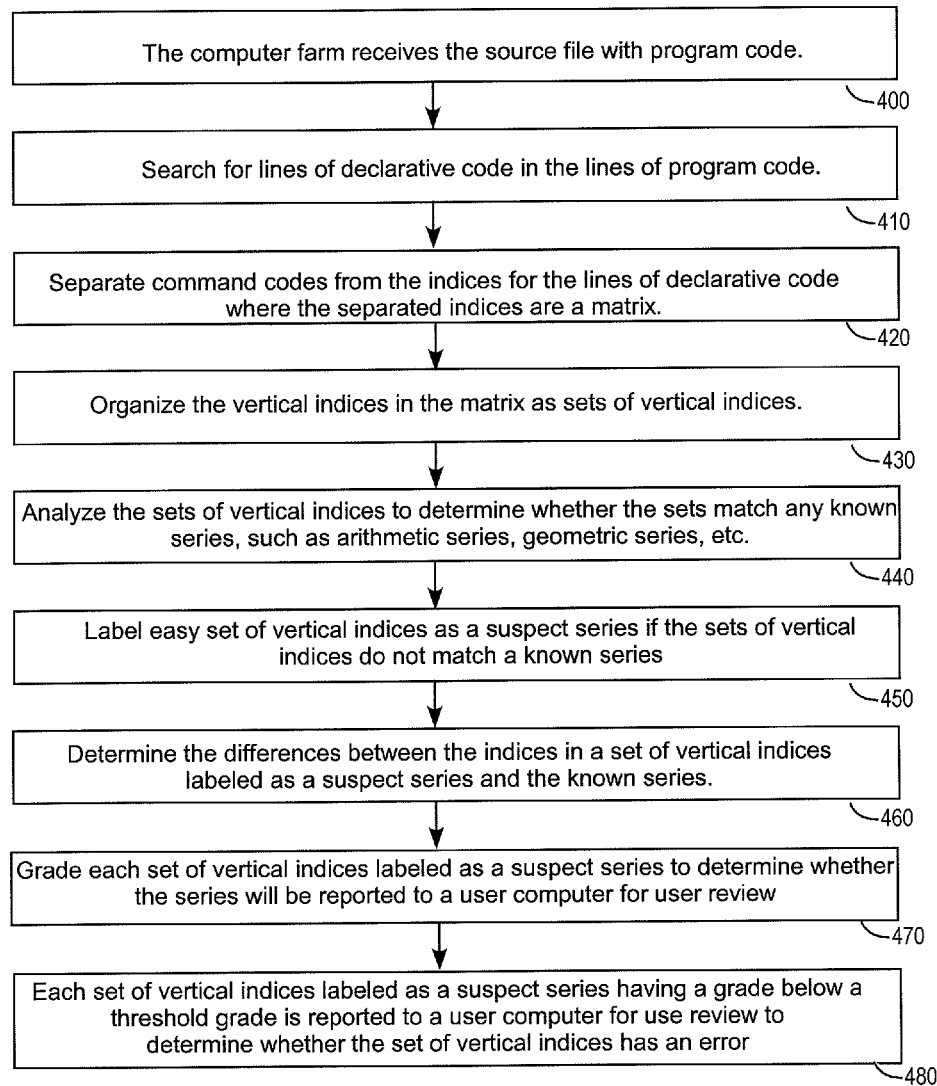
FIG. 4 is a high-level flow diagram of one embodiment of a computerized method of the present invention for identifying potential errors in the indices of lines of programming code, where the lines of programming code may include lines of command code.

FIG. 4 is a high-level flow diagram of one embodiment of a computerized method 400 of the present invention for identifying potential errors in the indices of lines of programming code, where the lines of programming code may include lines of command code. The high-level flow diagram is exemplary and should not be limiting on the claims. Those of skill in the art will recognize that various steps may be added, combined, etc. without departing from the spirit and purview of the described embodiment. The computerized method may be executed by computer system 100. For example, the computerized method may be executed by the computers on the computer farm under the direction of the user computer. Results of the computerized method may be reported from the computer farm to the user computer. For example, the results of the computerized method may be stored in the user computer's memory for printing or display on the user computer's computer monitor for viewing by a user.

At an initial step 400, a source file 230 (see FIG. 1), which includes a plurality of lines of program code 240, is received by the computer farm. The source file may be received by the computer farm from a number of sources, such as a server on the Internet, a server on an Intranet, a disk, or the like. The source file includes lines of program code from a declarative language, such as HDL. These lines of program code may include a number of lines of command codes. The source file may be for a design, a verification program for verifying a design, or the like.

At a step 410, one or more of the computers on the computer farm search through the plurality of lines of program code in the source file to locate the lines of the declarative language, such as the lines of command codes.

At a step 420, according to one embodiment, the computers on the computer farm are configured to determine whether three or more consecutive lines of commands codes have the same command codes. The computers on the computer farm may be configured to parse the lines of command codes and make comparisons of the commands in the lines of command codes to determine whether three or more consecutive lines of commands codes have the same command codes.

For example, if the computers on the computer farm locate 40 lines of command codes in source file 230, the first 20 lines of command codes might have the same commands, the following 2 lines of command codes might have different commands from the first 20 lines of command codes. The following 18 lines of commands codes might also have the same commands, for example. FIG. 5A shows 40 example lines of command codes having the above discussed configuration of 20 lines command codes having the same commands, the next 2 lines have commands different from the preceding 20 lines and different from the following 18 lines.

Each set of consecutive lines of commands codes having three or more lines of commands codes with the same commands is processed according to the following steps of the method. For example, the 20 lines of command codes, and the 18 lines of command codes discussed above and shown in FIG. 5A will each be processed according to the following discussed steps of the method (steps 430-490).

Each set of consecutive lines of commands codes having two lines of commands codes with the same commands where the commands in these lines of command code differ from surrounding lines of command codes are not processed according to the following steps of the method. For example, the 2 lines of command code discussed above and shown in FIG. 5A, which are between the set of 20 lines of command codes and the set of 18 lines of command codes, are not processed according to the following discussed method steps (steps 430-490). Further, a "singular" line of command code that has commands the differ from preceding lines of commands codes and following lines of command codes is not processed according to the following discussed method steps.

At step 430, the indices in the located lines of command codes having three or more consecutive lines of command codes with the same commands are separated from the commands. It is noted that order of steps 420 and 430 may be switched. It will be well understood by those of skill in the art that various steps in the method may be rearranged without departing from the spirit and purview of the presently described embodiment. For example, if the order of steps 420 and 430 are switched, all the lines of commands codes identified in source file 230 may have the commands separated from the indices, and there after three or more consecutive lines of commands codes having the same commands may be identified.

FIG. 5B shows exemplary lines of "separated" command codes generated from the lines of command codes shown in FIG. 3. As shown in FIG. 5, the indices form a matrix. At step 440, the vertical columns 500 in the matrix are organized as sets of indices, also sometimes referred to herein as sets of vertical indices. For example, for the matrix of indices shown in FIG. 5, column 500a is organized as a first set of indices, column 500b is organized as a second set of indices, column 500c is organized as a third set of indices, column 500d is organized as a fourth set of indices, column 500e is organized as a fifth set of indices, and column 500f is organized as a sixth set of indices.

FIG. 6 shows the columns organized as sets of indices. Each set of indices represents successive steps for the command codes. For example, for timing data, a set of indices may represent temporally successive events in a verification process of an IC design. For a clock example, the indices change from 0 to 1 may represent clocking events or the like. Those of skill in the art will recognize that the indices may represent a variety of data types for a variety of purposes. The foregoing are mentioned for exemplary purposes.

At step 450, each set of indices is analyzed by the computer farm to determine whether a known series might exist in the set of indices. The sets of indices may be analyzed to determine whether there are series of the same number, for example (0, 0, 0, 0, 0, 0). According to an alternative embodiment, each set of indices may be analyzed to determine whether an arithmetic series exists, e.g., (2, 4, 6, 8, . . . ). According to another alternative embodiment, each set of indices may be analyzed to determine whether a geometric series exists, e.g., (1, 2, 4, 8 . . . ). According to another alternative embodiment, each set of indices may be analyzed to determine whether a repeating series exists, e.g., (1, 2, 3, 4, 1, 2, 3, 4, 1, 2, 3, 4 . . . ). According to another alternative embodiment, each set of indices may be analyzed to determine whether a double series exists, e.g., (1, 1, 1, 1, 2, 2, 2, 2, 4, 4, 4, 4, 8, 8, 8, 8 . . . ). Each set of indices may also be analyzed to determine whether other series exist, such as an arithmetic-geometric series (1, 3, 7, 15, 31 . . . ), a binary number of ones series (000, 001, 010, 100, 011, 101, 110, 111), or any number of other known series. It will be understood by those of skill in the art that the above list of known series is not exhaustive and other known series are to be considered part of the described embodiment. For example, a user might define one or more known series against which the set of indices might be compared.

At step 460, if it is determined that no series exists in a set of indices, then the set of indices is labeled a suspect series. At a subsequent step, each set of indices that is labeled as a suspect series is analyzed by the computer farm to determine whether the series in the set of indices has an error, such as a copy paste error. For example, at a step 470 each set of indices labeled as a suspect series is compared to a plurality of known series (such as those described above with respect to step 440) to determine the differences between the known series and the set of indices. According to some embodiments, steps 440 and 450 may be performed in combination. Differences between a set of indices and a known series are quantified by the number of steps a set of indices differs from a known series. If one number in a set of indices differs from a known series, then the set of indices is said herein to be off by one step. For example, if a set of indices includes the numbers (1, 2, 3, 4, 4, 6), then the set of indices is said to be off by one step from the known arithmetic series (1, 2, 3, 4, 5, 6). The set of indices (1, 2, 3, 4, 4, 6) is four steps from the known geometric series (1, 2, 4, 8, 10, 12). Further, the set of indices (1, 2, 4, 5, 6) may be identified as being one stop from the known arithmetic series (1, 2, 3, 4, 5, 6), where the number "3" is missing from the set of indices. Those of skill in the art will recognize other ways to identify a number of steps by which a set of indices differs from a known series.

At a subsequent step 480, each set of identifiers identified as a suspect series is graded. A grade below a threshold grade may indicate that the suspect series is to be reported to a user via a user's user computer. A grade at or above the threshold grade may indicate that the suspect series is not to be reported to a user. The grade for a suspect series may be calculated in a variety ways. According to one embodiment, the number of steps by which a suspect series differs from a known series may be divided by the length (i.e., number of indices in the suspect series) of the suspect series to generate an "initial" grade. For example, if a set of indices, which is labeled as suspect, includes the indices (1, 2, 3, 4, 5, 6, 7, 8, 8, 10), and this set of indices differs from a known good series (1, 2, 3, 4, 5, 6, 7, 8, 9, 10), then the initial grade for the set of indices is 1/10.

This initial grade may be raised or lowered based on one or more other factors to generate a final grade. For example, if a set of indices is labeled as a suspect series and is preceded by a number of sets of indices having known series, it may be likely that the set of indices, which is labeled as a suspect series, does have a typographical error therein. Therefore, the initial grade for the set of indices labeled as suspect series is lowered so that the set of indices is reported to a user via the user's user computer.

Alternatively, if sets of indices (e.g., four sets of indices (1204), (1214), (1224), and (1234) are in a source file and follow each other sequentially in lines of command codes, several of the sets of indices may be labeled as suspect series. For example the following lines of command codes might generate the four sets of indices (1204), (1214), (1224), and (1234):

clock1
clock2
clock0
clock4
clock1
clock2
clock1
clock4
clock1
clock2
clock2
clock4
clock1
clock2
clock3
clock4

In the example being considered, the first, second, and third set of indices may be labeled as suspect series. However, these four sets of indices reviewed as a group by the computer farm (according to some embodiments of the present invention) indicates that there is a series (e.g., 0, 1, 2, 3) in the third index in four sets of indices. It appears as though the series in these sets of indices is intended by a programmer. Therefore, the initial grades of the first three sets of indices, which were labeled as suspect series, may be raised so that the first three sets of indices are not reported to a user via user computer 110 for further review.

At a subsequent step 490, sets of indices labeled as suspect series and having final grades below a threshold grade are reported to a user via user computer 110. The user may then visually inspect the reported sets of indices to determine whether the suspect errors are actual errors. Therefore, the user has been saved the time of visually inspecting her lines of command codes for errors, as lines of command codes with potential errors are identified and presented to her via user computer 110.

According to one alternative embodiment, lines of command codes might be grouped as paragraphs. A paragraph includes a plurality of lines of command codes. For example, a paragraph might include four lines of command coded where one or more of the lines of command codes are not the same as the other lines of command codes in the paragraph. A plurality of paragraphs might include a number of paragraphs where each paragraph includes four lines of command codes, for example. See, for example, FIG. 7A that shows five example paragraphs 700a-700e where each example paragraph includes four example lines of command codes. It is noted that the four lines of command codes in each paragraph are different from one another, however, every line in a paragraph might not be different from every other line. Some lines of command codes in a paragraph might be the same. Lines of commands codes might be different from one another if the lines of command codes include different commands, different numbers of commands, different commands and different numbers of commands, or the like.

According to one embodiment, the computers on the computer farm are configured to treat the lines of command codes in a paragraph as a single line of command codes. That is, the commands in the lines of command codes for a paragraph are removed, and the indices for the paragraph are organized into a matrix of indices, where the indices in a paragraph are a single line of indices in the matrix. See, for example, FIG. 7B that shows a matrix of indices, which includes the lines of indices 705a-705e where these lines of indices respectively correspond to the paragraph 700a-700e shown in FIG. 7A. The column of indices in the matrix of indices may thereafter be analyzed (as described above) to determine whether each column of indices matches a known series or differs from a known series. Specifically, one or more of the steps described above with respect to FIG. 4 may be applied to the columns of indices formed from a number of paragraphs. For example, computers on the computer farm may be configured to analyze the columns of indices to determine whether each column of indices matches a known series and report determinations to the user computer. For example, the computers on the computer farm may be configured to determine that the column of indices indicated by the set of arrows in FIGS. 7A and 7B (e.g., 8, 9, 9, 11, 12) likely has an error in that the second "9" should likely be a "10". This embodiment might also be thought of as forming a column of indices from the common positions of indices in a paragraph. The arrows in FIG. 7A indicate indices having the same position in each paragraph where the indices are a column of indices. The same columns of indices that indicated by the arrows in FIG. 7A is similarly indicated by a set of arrows in FIG. 7B.

According to another alternative embodiment of the present invention, lines of command codes might be grouped as paragraphs as discussed immediately above, however corresponding lines of command codes in a number of paragraphs might not match one another, and the computers on the computer farm may be configured to ignore the non-matching lines of command codes in forming a matrix of indices. Corresponding lines of command codes might not match one another if the number of indices in the lines of command codes do not match, and/or the commands for the indices do not match. Lines of command codes that correspond to one another have the same positions in respective paragraphs. For example, the first lines of command codes of each paragraph are said to correspond to one another, the second lines of command codes of each paragraph are said to correspond to one another, and so on.

FIG. 8A shows five example paragraphs 800a-800e where each example paragraph includes four example lines of command codes. As seen in FIG. 8A, the first lines of command codes 805*b* and 805C for the second and third paragraphs do not match the first lines of command codes 805*a*, 805*d*, and 805*e* of the first, third, and fourth paragraphs. Specifically, the line of command codes 805*b* includes one more index than the lines of command codes 805*a*, 805*d*, and 805*e*, and the line of command codes 805*c* includes two more indices than the lines of command codes 805*a*, 805*d*, and 805*e*. The computers on the computer farm are configured to determine whether corresponding lines of command codes in a set of paragraphs do not match, and generate a matrix of indices based on the corresponding lines of command codes that do match. That is, the matrix of indices does not include a column of indices for corresponding to lines of command codes that do not match. FIG. 8B shows an example matrix of indices that might be generated by the computer farm from paragraphs 800*a*-800*e* shown in FIG. 8A. The matrix of indices does not include a column of indices, which corresponds to the first line of command codes for each paragraph. After the matrix of indices is generated the computers on the computer farm may be configured to apply one or more of the steps discussed above with respect to FIG. 4 to determine whether the columns of indices in the matrix of indices match a known series or differ from a known series, and report a determination to the user computer for use by the user. For example, the computer farm might determine that the column of indices indicated by the set of arrows in FIG. 8B (e.g., 8, 9, 9, 11, 12) likely has an error in that the second "9" should likely be a "10".

FIG. 9 is an exemplary output that may be displayed on computer monitor 140 for viewing by a user. The exemplary output shown in FIG. 9 may be for the example of FIG. 3. The exemplary output may include lines of command codes, which includes a suspect line of command code. The exemplary output may include the set of indices labeled a suspect series. According to some embodiments, the suspected error in a set of indices may also be identified (described in further detail immediately below).

According to an alternative embodiment, a set of indices, which is labeled as a suspect series, is compared to a known series from which the set of indices differs by a predetermined number steps (e.g., 2 steps). The index or indices that differ from the known series may be identified to the user via user computer 110. For example, the set of indices 00112233345566 may be reported to the user as a suspect series and the third "3" may be reported as a index which is also suspect. See, for example, FIG. 9. According to a further embodiment, a suggestion may be made by the computer farm to the user via user computer 110 that the suspect "3" might be changed to a "4" to adjust the suspect series to a known series. The line(s) of command code that includes the suspect index (or indices) might also be reported to the user via the user's user computer.

According to one embodiment of the present invention, indices may include symbols. Symbols might include letters, grammatical marks, such as "&", "|", "~", etc. According to a further embodiment, indices may include symbols and numbers.

FIG. 10 shows a number of lines of command codes that includes symbols "!" and "&". In the lines of command codes shown in FIG. 10, the programmer likely intended that in the last line a "!" be included in front of the term "addr[0]", and not in front of the term "addr[1]". The steps shown in FIG. 4 may be used to identify this possible error for reporting to the user. The possible error might be detected by an alternative embodiment where after separating the symbols from the command codes, the symbols may be converted to alternative characters, such as numbers for analysis. The numbers to which the symbols are converted to might be binary, base 10 or the like for analysis. Alternatively, the symbols may be converted to a first bases and then to a subsequent basis for analysis. For example, the symbols may be converted to binary and then to base 10 for analysis. Series recognition, such as the series recognition described with respect to FIG. 4, may be applied by the computer farm to the numerical values. According to the example being considered in FIG. 10, is a first step the symbols may be separated from the commands to generate the lines "a !b c"; "a !b c"; "a !b c" where the letters "a", "b", and "c" respectively represent the commands "full_"; "addr[ ]", and "addr[ ]". The indices in these lines "a !b !c"; "a !b c"; "a !b c" may then be converted to numerical values for pattern recognition. For example, the indices may be converted to binary as 100, 101, 101, or in base ten as 4, 5, 5. For example, the indices represented in base 10 may be recognized by the computer farm as being one step away from the known series 4, 5, 6, and may further be configured to determine that a copy paste error occurred in the last symbol of the third line of command codes shown in FIG. 10. That is, potential errors may be graded as described above and report to a user via user computer 110, for example if the final grade is less then the threshold grade.

FIG. 11 is an exemplary output that may be displayed on computer monitor 140 for viewing by a user. The exemplary output may be for the example of symbol potential errors described immediately above. FIG. 11 is an exemplary output that indicates no pattern was found in the set of indices.

It is to be understood that the examples and embodiments described above are for illustrative purposes only and that various modifications or changes in light thereof will be suggested to persons skilled in the art, and are to be included within the spirit and purview of this application and scope of the appended claims. For example, while it has been described herein that embodiments of the present invention are directed to declarative languages, embodiments of the present invention may be used for nearly any type of programming language having repetitive lines of command codes where it is likely to introduce typographical errors, such as by cutting and pasting lines of command codes to build up a program. Therefore, the above description should not be understood as limiting the scope of the invention as defined by the claims.

What is claimed is:

1. A computerized method for detecting potential errors in lines of program code, the computerized method comprising the steps of:

searching, by a set of computers, for lines of command codes in the lines of program code, wherein a line of command code includes a set of command codes and a set of indices for the set of command codes, wherein the lines of command codes are organized as a plurality of paragraphs, and at least one of the lines of commands codes in each of the paragraphs is different from the other lines of commands codes in the paragraph;

separating, by the set of computers, the sets of command codes from the sets of indices for the lines of command codes, wherein the sets of indices are a matrix of indices, and each row of indices in the matrix of indices includes the sets of indices for each of the lines of command codes from one of the paragraphs;

determining, by the set of computers, each set of vertical indices in the matrix of indices that does not match at least one known series in a set of known series; and reporting, by the set of computers, to a user computer each set of vertical indices that does not match the at least one known series.

2. The computerized method of claim 1, wherein at least one of the lines of commands codes in one of the paragraphs does not match a corresponding line of commands codes in another one of the paragraphs, and the matrix of indices does not include a column of indices, which corresponds to the at least one line of command codes and the lines of command codes corresponding to the at least one line of command codes.

3. The computerized method of claim 2, further comprising:
displaying on the user computer, for each of the sets of vertical indices that does not match the at least one known series, the number of steps for each of the sets of vertical indices that does not match the at least one known series.

4. The computerized method of claim 3, further comprising:
generating, by the set of computers, a grade for each of the sets of vertical indices that does not match the at least one known series based on the number of steps that the set of vertical indices does not match the at least one known series and based on the number of indices in the set of vertical indices,
wherein the reporting step further includes:
reporting, by the set of computers, to a user computer each set of the vertical indices that does not match the at least one known series if the grade for the set of vertical indices is below a threshold grade; and
not reporting, by the set of computers, to a user computer each set of the vertical indices that does not match the at least one known series if the grade for the set of vertical indices is the same as, or above, the threshold grade.

5. The computerized method of claim 4, wherein the grade is further based on at least one set of vertical indices that precedes each of the sets of vertical indices that does not match the at least one known series.

6. The computerized method of claim 5, wherein the grade is further based on at least one set of vertical indices that follows each of the sets of vertical indices that does not match the at least one known series.

7. The computerized method of claim 1, further comprising:
displaying on the user computer each of the sets of vertical indices that does not match the at least one known series.

8. The computerized method of claim 1, further comprising:
determining, by the set of computers, within each of the sets of vertical indices that does not match the at least one known series, the indices that differ from the at least one known series, wherein the reporting step includes reporting to the user computer the indices that differ from the at least one known series.

9. The computerized method of claim 1, further comprising:
displaying on the user computer, for each of the sets of vertical indices that does not match the at least one known series, the indices that differ from the at least one known series.

10. The computerized method of claim 1, wherein the reporting step includes reporting to the user computer replacement indices from the at least one known series that differ from each of the sets of vertical indices that does not match the at least one known series.

11. The computerized method of claim 10, further comprising:
displaying on the user computer, for each of the sets of vertical indices that does not match the at least one known series, the replacement indices.

12. The computerized method of claim 1, further comprising:
reporting, by the set of computers to the user computer, the lines of command codes.

13. A non-transitory computer readable storage medium containing program instructions that, when executed by a controller within a computer, cause the controller to execute a method for detecting potential errors in lines of program code, the method comprising:
searching, by a set of computers, for lines of command codes in the lines of program code, wherein a line of command code includes a set of command codes and a set of indices for the set of command codes, wherein the lines of command codes are organized as a plurality of paragraphs, and at least one of the lines of commands codes in each of the paragraphs is different from the other lines of commands codes in the paragraph;
separating, by the set of computers, the sets of command codes from the sets of indices for the lines of command codes, wherein the sets of indices are a matrix of indices, and each row of indices in the matrix of indices includes the sets of indices for each of the lines of command codes from one of the paragraphs;
determining, by the set of computers, if each set of vertical indices in the matrix of indices that does not match at least one known series in a set of known series; and
reporting, by the set of computers, to a user computer each set of vertical indices that does not match the at least one known series.

14. The computer readable storage medium of claim 13, wherein at least one of the lines of commands codes in one of the paragraphs does not match a corresponding line of commands codes in another one of the paragraphs, and the matrix of indices does not include a column of indices, which corresponds to the at least one line of command codes and the lines of command codes corresponding to the at least one line of command codes.

15. The computer readable storage medium of claim 14, further comprising:
displaying on the user computer, for each of the sets of vertical indices that does not match the at least one known series, the number of steps for each of the sets of vertical indices that does not match the at least one known series.

16. The computer readable storage medium of claim 15, further comprising:
generating, by the set of computers, a grade for each of the sets of vertical indices that does not match the at least one known series based on the number of steps that the set of vertical indices does not match the at least one known series and based on the number of indices in the set of vertical indices,
wherein the reporting step further includes:
reporting, by the set of computers, to a user computer each set of the vertical indices that does not match the at least one known series if the grade for the set of vertical indices is below a threshold grade; and
not reporting, by the set of computers, to a user computer each set of the vertical indices that does not match the at least one known series if the grade for the set of vertical indices is the same as, or above, the threshold grade.

17. The computer readable storage medium of claim 16, wherein the grade is further based on at least one set of vertical indices that precedes each of the sets of vertical indices that does not match the at least one known series.

18. The computer readable storage medium of claim 17, wherein the grade is further based on at least one set of vertical indices that follows each of the sets of vertical indices that does not match the at least one known series.

19. The computer readable storage medium of claim 13, further comprising:
displaying on the user computer each of the sets of vertical indices that does not match the at least one known series.

20. The computer readable storage medium of claim 13, further comprising:
determining, by the set of computers, within each of the sets of vertical indices that does not match the at least one known series, the indices that differ from the at least one known series, wherein the reporting step includes reporting to the user computer the indices that differ from the at least one known series.

21. The computer readable storage medium of claim 13, further comprising:
displaying on the user computer, for each of the sets of vertical indices that does not match the at least one known series, the indices that differ from the at least one known series.

22. The computer readable storage medium of claim 13, wherein the reporting step includes reporting to the user computer replacement indices from the at least one known series that differ from each of the sets of vertical indices that does not match the at least one known series.

23. The computer readable storage medium of claim 22, further comprising:
displaying on the user computer, for each of the sets of vertical indices that does not match the at least one known series, the replacement indices.

24. A computer system comprising:
a set of computers, wherein each of the computers is configured to perform a portion of a method for detecting potential errors in lines of program code, and each computers includes at least one processor, and a computer-readable memory including computer code for the processor to execute a portion of the method, wherein the method includes the steps of:
searching, by the set of computers, for lines of command codes in the lines of program code, wherein a line of command code includes a set of command codes and a set of indices for the set of command codes, wherein the lines of command codes are organized as a plurality of paragraphs, and at least one of the lines of commands codes in each of the paragraphs is different from the other lines of commands codes in the paragraph;
separating, by the set of computers, the sets of command codes from the sets of indices for the lines of command codes, wherein the sets of indices are a matrix of indices, and each row of indices in the matrix of indices includes the sets of indices for each of the lines of command codes from one of the paragraphs;
determining, by the set of computers, each set of vertical indices in the matrix of indices that does not match at least one known series in a set of known series; and
reporting, by the set of computers, to a user computer each set of vertical indices that does not match the at least one known series.

* * * * *